Patented Oct. 30, 1951

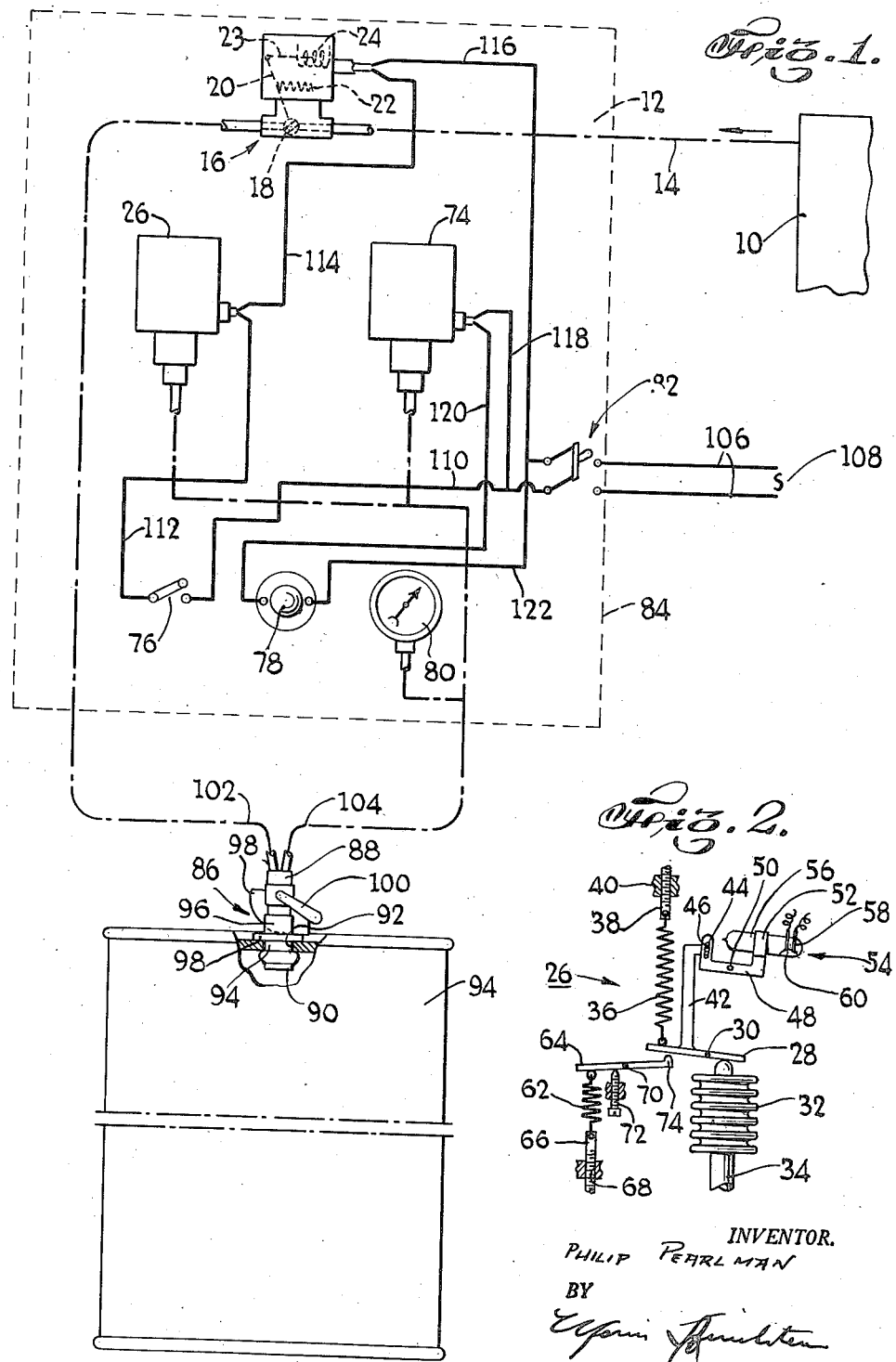

2,573,053

UNITED STATES PATENT OFFICE 2,573,053

SYSTEM FOR TESTING CLOSED RECEPTACLES FOR LEAKS

Philip Pearlman, Chicago, Ill., assignor to United States Barrel & Drum Corporation, New York, N. Y., a corporation of Delaware Application May 21, 1948, Serial No. 28,364

7 Claims. (Cl. 73—40)

1

This invention relates to systems for testing closed receptacles. More particularly, the invention pertains to systems which are characterized by their rapidity in determining the presence of leaks.

It is common practice to reuse receptacles such as drums and tank cars commercially employed to carry fluids. Depending upon the nature of their use, these receptacles have to be cleaned after a single or several refills. Sometimes the cleaning operation is quite severe, for instance, after handling oil, drums have to be sandblasted, washed and chained. It has been found that receptacles prepared for reuse in this manner often develop leaks. Inasmuch as if such receptacles are refilled their contents will be lost, it is imperative to detect the presence of leaks before reuse. Where the defects are visible, e. g. large cracks, no difficulty is encountered in weeding out the bad receptacles. However, on many occasions the defects consist only of a hairline crack or pinhole which a visual inspection cannot locate.

It is an object of the present invention to provide a system which is capable of very rapidly detecting the presence of such tiny defects in receptacles of the character described.

It is a further object of the invention to provide a leak detecting system which is simple to operate, will not get out of order easily, and is comparatively inexpensive.

In general, the several objects of the invention are achieved by flowing air from a high pressure source into the receptacle to be tested, cutting off the flow of compressed air when the pressure in the receptacle has reached a predetermined value less than that of the source, and thereafter observing the pressure in the receptacle to determine whether the same is maintained constant. Preferably, means is included to detect and signal, visually or audibly, when the pressure in the receptacle has dropped a small predetermined amount. The system desirably includes a mechanism which automatically cuts off flow of compressed air to the receptacle at the predetermined pressure, whereby the pressure in the receptacle can be built up very rapidly and cut off with substantial accuracy. This enables the system to operate speedily inasmuch as the receptacle not only is filled quickly, but a very small drop in pressure speedily can be ascertained.

Other objects of my invention will in part be obvious and in part will be pointed out hereinafter.

My invention accordingly consists in the features of construction, combinations of elements and arrangements of parts which will be exemplified in the construction hereinafter described, and of which the scope of application will be indicated in the appended claims.

In the accompanying drawings, in which is shown one of the various possible embodiments of my invention,

2

Fig. 1 is a schematic view of a system incorporating the instant invention; and

Fig. 2 is a diagrammatic view of one of the control mechanisms employed in said system.

Referring now in detail to the drawings, the reference numeral 10 denotes a tank or other suitable container in which air is maintained under pressure by conventional means such as an electrically driven compressor (not shown). The pressure of the air in the tank is maintained substantially above the testing pressure, for example, if a testing pressure of 8 pounds p. s. i. (per square inch) is employed, satisfactory results are obtained where the air pressure in the tank is 50 lbs. p. s. i.

The compressed air is led from the tank to the testing apparatus 12 through a conduit 14. Said apparatus includes an electrically controlled valve 16 of the normally closed type to whose inlet the conduit 18 is connected. The rotatable valve element 18 has a passageway normally disaligned with the ports in the valve seat. Secured to said element is a handle 20 through whose movement the passageway of the valve element can be brought into registry with the valve ports. The handle is urged by a compression spring 22 into a position corresponding to the closed position of the valve element. An armature 23 is operatively attached to the handle, said armature being associated with a solenoid 24 so that upon energization of the solenoid, the valve will be quickly opened. The spring 22 is strong enough to effect quick closing of the valve upon deenergization of the solenoid.

The apparatus 12 also includes a pressure responsive mechanism 26. By way of example, this mechanism may be a type of control which in itself is conventional and is characterized by the provision of a pair of normally closed contacts which are opened when a controlling pressure rises above a predetermined value. The mechanism is such that the contacts will reclose when the controlling pressure drops a certain amount, the drop for convenience hereinafter being referred to as the "differential pressure" drop. Desirably, the pressure at which the contacts open is regulatable in order that a pressure may be set which is suitable to the receptacle being tested. In addition, the differential pressure also may be regulatable.

It will be understood by those skilled in the art that various types of constructions may be employed to effect the foregoing operation. However, for the purpose of illustration, one such construction is shown in Fig. 2. From this figure it will be seen that the mechanism 26 includes an operating lever 28 which turns about a pivot 30. One end of the lever is connected to or bears against the closed end of a Sylphon bellows 32. The other end 34 of the Sylphon bellows is connected to conduit means which will be described hereinafter. Thus, as the pressure within the Sylphon bellows increases the operating lever 28 will rock in a counterclockwise direction as viewed from Fig. 2. The other end of the operating lever is attached to the lower end of a tension spring 36 whose upper end is connected to a screw 38 threaded in a tapped opening 40 in a stationary portion of the mechanism 26, whereby turning the screw will vary the pressure opposing expansion of the Sylphon bellows.

The operating lever 28 has mounted thereon a bracket 42 which carries a pin 44 slidable in a slot 46 of a bell crank lever 48. Said lever is pivoted at 50 and mounts a fixture 52 which supports a conventional mercury switch 54. This switch, as is usual, constitutes an envelope 56 at one end of which a pair of electrodes 58 are disposed within the envelope in proximity to one another. A pool of mercury 60 also is located within the envelope, said pool being sufficiently large to bridge the space between the two electrodes when the tube is in the proper position, such for instance as is shown in Fig. 2. When the Sylphon bellows expands, it will, through the bracket 42, pin 44 and slot 46, rock the bell crank lever 48 in a counterclockwise direction as viewed from Fig. 2. This motion will raise the end of the mercury switch containing the electrodes. If the switch is rotated sufficiently, the mercury will leave the two electrodes and flow to the opposite end of the tube, thus opening the circuit controlled by the mercury switch. Such action will take place at a predetermined angular position of the envelope 56.

The mechanism 26 also includes another tension spring 62 connected at one end to a lever 64, and at its opposite end to a screw 66 threaded through a tapped opening 68 in a stationary portion of the mechanism 26. The lever 64 turns about a pivot 70, being urged in a counterclockwise direction by the spring 62 to abut against the tip of a screw 72 threadedly received in a stationary portion of the mechanism 26, whereby the opposite end of the lever 64 may be disposed in a predetermined position when the lever 64 is idle. Said opposite end of the lever 64 has an abutment member 74 located beneath the end of the operating lever 28 associated with the tension spring 36. The spacing between said abutment member and the operating lever is controlled by the screw 72.

Said abutment member is so located with respect to the operating lever by adjustment of the screw 72 that the operating lever will contact the abutment member just before the mercury switch 54 reaches the position at which the pool of mercury flows away from the electrodes. With this arrangement, a rising pressure within the Sylphon bellows will cause the operating lever to tilt against the pressure of the spring 36 until the switch 54 is almost ready to open. Further tilting of the operating lever by increasing pressure in the bellows is opposed by the combined forces of the springs 38, 62 so that to open the switch 54, a pressure equivalent to the combined forces of the two springs is necessary. However, when the pressure falls, the switch will reclose when the operating lever disengages the abutment member. In other words, the pressure required to open the switch is governed by combined force of both springs, but the pressure at which the switch recloses is governed by the spring 36 alone. Accordingly, the spring 36 is sometimes referred to as the "pressure adjusting" spring, whereas the spring 62 is referred to as the "differential adjusting" spring. If the spring 36 is set to 6 pounds p. s. i., and the differential spring is set to 2 pounds p. s. i., the mercury switch will open when there is 8 pounds p. s. i. pressure in the Sylphon bellows, and will reclose when the pressure in the bellows drops to 6 pounds p. s. i.

The apparatus 12 includes a second pressure responsive mechanism 74. This mechanism likewise may be a controller having the same type of internal construction as the mechanism 26. However, the differential spring on the second pressure responsive mechanism preferably is lighter than that of the first.

In addition to the two pressure responsive mechanisms and the electrically controlled valve, said apparatus 12 includes a normally open single-pole single-throw hand controlled electric switch 76, an electrically controlled signalling means, e. g. an incandescent electric bulb 78, an air pressure gauge 80 and a double pole, single throw line electric switch 82. All of the parts of the apparatus 12 thus far described may be mounted on a board or panel 84 represented by dotted lines in Fig. 1.

Finally, the apparatus includes a fluid passing bung 86 which preferably is of the quick attaching and detaching type. By way of example, said bung includes a central pipe 88 having an outwardly extending flange 90 at its lower end which is sufficiently small easily to enter an aperture 92 in a receptacle 94 to be tested. Surrounding the pipe and resting on the flange 90 is a sleeve 94 of an elastomeric substance such as rubber whose outer diameter likewise is sufficiently small, when in relaxed condition, to enter the aperture in the receptacle. Slidably mounted on the pipe above the sleeve 94 is a collar 96 having an outwardly extending flange 98 at its lower end. This collar forms a follower for a cam 98 which is secured to a handle 100 pivotally mounted on the pipe 88.

The handle can be swung between two positions in one of which the flange 98 is relatively remote from the flange 90 and in the other of which the flange 98 is closer to the flange 90. In the first-named position of the cam the two flanges are spaced apart a distance substantially equal to the length of the elastomeric tube 94. In the other position of the cam the flanges compress the sleeve causing it to distend and frictionally engage the aperture 94. The pipe 88 terminates at its upper end in two hose fittings which receive conduits 102, 104. The conduit 102 runs from the pipe 88 to the outlet of the valve 16. The conduit 104 is connected to the Sylphon bellows of both the pressure responsive mechanisms 26, 74. Said conduit 104 also is attached to the inlet of the pressure gauge 80.

Leads 106 connect a source of electrical energy 108 to the stationary contacts of the line switch 82. One of the movable contacts of said switch is connected by a lead 110 to a contact of the hand switch 76, the other contact of said hand switch being connected by a lead 112 to one of the normally closed contacts of the first pressure responsive mechanism 26. The other contact of said mechanism is connected by a lead 114 to the solenoid 24 of the electrically controlled valve 16. A lead 116 runs from the other terminal of the solenoid to the other movable contact of the line switch.

Assuming that the receptacle 94 is to be tested at 8 pounds p. s. i. pressure, the two springs of the first pressure responsive mechanism 26 are set to give a combined pressure equivalent to 8 pounds p. s. i., e. g. the pressure adjusting spring is set at 6 pounds p. s. i. and the differential adjusting spring is set at 2 pounds p. s. i. If now, with the bung 86 firmly set in the opening in the receptacle 94 (all other openings being closed), the line switch 82 and the hand switch 76 are closed, potential will be applied to the solenoid 24 causing the valve 16 to open and allow air under pressure to flow from the tank 10 into the receptacle. As air flows into the receptacle, the increasing pressure therein will be registered on the gauge 80 and will be applied to the Sylphon bellows of the first pressure responsive mechanism 26. When the pressure in the receptacle 94 reaches 8 pounds p. s. i., it will open the normally closed contacts of the first pressure responsive mechanism. This will break the circuit energizing the solenoid 24 and allow the spring 22 to close the valve 16. In practice, I have found that the pressure responsive mechanism will cut off air in very exact response to the pressure of the air within the receptacle so that when the valve 16 is closed, the pressure in the receptacle will be very close to, i. e., within two ounces or less of the pre-set cut off pressure. Moreover, the pressure in the receptacle will not vary from receptacle to receptacle being tested even with the usual variations in the pressure maintained in the tank due to the compressor cutting in and out.

The second pressure responsive mechanism 74 is connected in circuit as follows: A lead 118 runs from one of the movable contacts of the line switch 82 to a normally closed contact of said mechanism 74. From the other contact of said mechanism a lead 120 runs to one side of the signalling means 78. The other side of the signalling means is connected by a lead 122 to the other movable contact of the line switch.

The cut-off pressure of the pressure responsive mechanism 74 is set as close as possible to but below the cut-off of the mechanism 26. Thus, if the mechanism 26, in the example given above, cuts off at 8 pounds p. s. i., the mechanism 74 is set to cut off at approximately 7 pounds, 14 ounces p. s. i. This may be done, for example by having the pressure adjusting spring in the mechanism 74 set to 6 pounds, 5 ounces p. s. i. and the differential adjusting spring set to 9 ounces. With this arrangement, when the air in the receptacle 94 being tested reaches a pressure sufficiently high to open the normally closed contacts of the first pressure responsive mechanism 26, it will, just prior to opening said contacts, open the normally closed contacts of the second pressure responsive mechanism 74. Therefore, the light 78 which is energized at the time the line switch 82 is closed will be deenergized just prior to attainment of cut-out pressure.

The receptacle fills up very quickly so that a few seconds after the line switch and hand switch are closed, the light will go out. Subsequently, if there is a leak in the receptacle, the pressure in the conduit 104 will drop.

Because I am able to obtain the predetermined cut-out pressure with a high degree of accuracy, the cut-in or differential pressure of the pressure responsive mechanism 74 can be set very close to said cut-out pressure, in the instant case 9 ounces, p. s. i., whereby the pressure responsive mechanism 74 is very sensitive to a drop in pressure. Even a comparatively tiny leak in the receptacle 94 will, at a cut-out pressure of 8 pounds p. s. i., drop within a comparatively short time to the cut-in pressure of the pressure responsive mechanism 74. I have found that if the cut-out pressure is 8 pounds p. s. i., any leak in a drum which would render it unfit for use will cause a pressure drop of 9 ounces p. s. i. to be reached within less than fifteen seconds. When the pressure in the receptacle drops to the predetermined cut-in pressure, the light 78 will be reenergized.

Therefore, to test a receptacle, an operator simply puts the bung 86 in place, the switch 82 having been previously closed, and closes the switch 76. He then watches the light 78. Within a few seconds after closing the switch 76, the light will go out. If the light does not go on again within about 15 seconds, he knows that the receptacle being tested is satisfactory.

If a leaky receptacle is left connected with the testing apparatus after the light goes on again, the pressure will drop back to the cut-in pressure of the first pressure responsive mechanism 26 and will reopen the valve 16. However, such an operation is not necessary to the practice of my invention, and, therefore, if desired, the differential pressure function of said first pressure responsive mechanism may be omitted, providing, however, that said mechanism is not so constructed as to cut-in just below its cut-out pressure.

The gauge 80 is employed for checking purposes.

It thus will be seen that I have provided a system for testing closed receptacles which achieves the several objects of my invention and is well adapted to meet the conditions of practical use.

As various possible embodiments may be made of this invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An apparatus for testing closed receptacles, which apparatus is adapted to be used with a source of compressed air and a source of electric energy, said apparatus comprising a normally closed electrically controlled valve, a quick attachable and detachable fluid-passing bung adapted to be attached to and detached from a receptacle to be tested, conduit means connecting said source of compressed air to the inlet of said valve, conduit means connecting the outlet of said valve to said bung, a switch, means controlled by the switch and responsive to the pressure within the receptacle being tested to connect said source of electric energy to said valve and thereby open the same when the switch is closed and the receptacle is being filled with compressed air so long as the pressure in said receptacle is below a predetermined pressure less than the pressure of the source of compressed air and to disconnect said source of electric energy from said valve and thereby close the same when the air pressure of the receptacle being filled is at said predetermined pressure, whereby said receptacle will be filled with air at a predetermined pressure less than and independent of the pressure of the source of compressed air, an electrically controlled signalling means, and means responsive to the pressure of the air within the receptacle to connect the signalling means to said source of electric energy and thereby render the same effective when the pressure of the air inside the receptacle being tested falls a predetermined amount below the predetermined pressure.

2. An apparatus for testing closed receptacles, which apparatus is adapted to be used with a source of compressed air and a source of electric energy, said apparatus comprising a normally closed electrically controlled valve, a quick attachable and detachable fluid-passing bung adapted to be attached to and detached from a receptacle to be tested, conduit means connecting said source of compressed air to the inlet of said valve, conduit means connecting the outlet of said valve to said bung, a switch, pressure responsive means connected to said bung, said pressure responsive means being controlled by said switch and controlling the supply of electric energy to said valve in such manner as to open said valve and maintain the same open when the switch is closed and the receptacle is being filled with air so long as the pressure in the receptacle is below a predetermined pressure less than the pressure of the source of compressed air and to close said valve when the air pressure in the receptacle being filled is at said predetermined pressure, whereby said receptacle will be filled with air at a predetermined pressure less than and independent of the pressure of the source of compressed air, an electrically controlled signalling means, and pressure responsive means connected to said bung and controlling the supply of electric energy from the source of electric energy to said signalling means, the pressure at which said second pressure responsive means is operative to energize the signalling means being less than the pressure at which the first pressure responsive means is operative to cut-off flow of air at the electrically controlled valve.

3. An apparatus for testing closed receptacles, which apparatus is adapted to be used with a source of compressed air and a source of electric energy, said apparatus comprising a normally closed electrically controlled valve, a quick attachable and detachable fluid-passing bung adapted to be attached to and detached from a receptacle to be tested, conduit means connecting said source of compressed air to the inlet of said valve, conduit means connecting the outlet of said valve to said bung, a normally closed pair of electric contacts, means connecting said pair of contacts in series with said valve, a switch in series with said pair of contacts and said source of electric energy, a pressure responsive means operatively connected to said pair of contacts and arranged to open said contacts when the pressure applied thereto reaches a predetermined value, conduit means connecting said bung to said pressure responsive means whereby when said bung is connected to a receptacle to be tested and said switch is closed, said receptacle will be filled with air at a predetermined pressure less than and independent of the pressure of the source of compressed air, a signalling means, a second pair of contacts, means to connect said second pair of contacts in series with said source of electric energy and said signalling means, pressure responsive means operatively connected to said second pair of contacts, said second pressure responsive means being constructed to operate said second pair of contacts and render the signalling means effective at a predetermined pressure less than that of the predetermined pressure at which said first pair of contacts are opened, and conduit means connecting said second pressure responsive means to said bung whereby said second pair of contacts automatically will be actuated to render said signalling means effective if a leak is present in said receptacle.

4. An apparatus as set forth in claim 3 wherein means is provided for regulating the predetermined pressure at which the second-named pressure responsive means operates the second-named pair of contacts to render the signalling means effective.

5. An apparatus as set forth in claim 3 wherein means is provided to regulate the predetermined value of the pressure at which the first-named pressure responsive means opens the first-named pair of contacts.

6. An apparatus as set forth in claim 3 wherein means is provided for regulating the predetermined pressure at which the second-named pressure responsive means operates the second-named pair of contacts to render the signalling means effective, and wherein means is provided to regulate the predetermined value of the pressure at which the first-named pressure responsive means opens the first-named pair of contacts.

7. An apparatus for testing closed receptacles, which apparatus is adapted to be used with a source of compressed air and a source of electric energy, said apparatus comprising a normally closed electrically controlled valve, a quick attachable and detachable fluid-passing bung adapted to be attached to and detached from a receptacle to be tested, conduit means connecting said source of compressed air to the inlet of said valve, conduit means connecting the outlet of said valve to said bung, a normally closed pair of electric contacts, means connecting said pair of contacts in series with said valve, a switch in series with said pair of contacts and said source of electric energy, a pressure responsive means operatively connected to said pair of contacts and arranged to open said contacts when the pressure applied thereto reaches a predetermined value, conduit means connecting said bung to said pressure responsive means whereby when said bung is connected to a receptacle to be tested and said switch is closed, said receptacle will be filled with air at a predetermined pressure less than and independent of the pressure of the source of compressed air, a signalling means, a second pair of normally closed contacts, means to connect said second pair of contacts in series with said sources of electric energy and said signalling means, a pressure responsive means operatively connected to said second pair of contacts, said second pressure responsive means being constructed to open said second pair of contacts at a pressure less than that of the predetermined pressure at which said first pair of contacts are opened and to reclose said second pair of contacts at a predetermined pressure below the predetermined pressure at which said first pair of contacts are opened, and conduit means to said bung whereby said second pair of contacts automatically will be actuated to render said signalling means effective by reclosing said second pair of contacts if a leak is present in said receptacle.

PHILIP PEARLMAN.

REFERENCES CITED

The following references are of record in the file of this patent:

UNITED STATES PATENTS

| Number | Name | Date |
| --- | --- | --- |
| 1,297,113 | Domenico | Mar. 11, 1919 |
| 1,350,358 | Cone | Aug. 24, 1920 |
| 1,884,942 | Widell | Oct. 25, 1932 |
| 1,933,322 | Fagan | Oct. 31, 1933 |
| 2,472,973 | Hoffman et al. | June 14, 1949 |